Jan. 21, 1936.  S. E. THOMAS  2,028,633
SEAT
Filed Dec. 29, 1933   2 Sheets-Sheet 1

INVENTOR
SYDNEY E. THOMAS, Deceased,
By EVA E. THOMAS, Executrix
of the Estate of said
Sydney E. Thomas
By
ATTORNEY Jan. 21, 1936.  S. E. THOMAS  2,028,633
SEAT
Filed Dec. 29, 1933   2 Sheets-Sheet 2

INVENTOR
SYDNEY E. THOMAS, Deceased,
By EVA E. THOMAS, Executrix
of the Estate of said
Sydney E. Thomas
By
ATTORNEY Patented Jan. 21, 1936

2,028,633

UNITED STATES PATENT OFFICE 2,028,633

SEAT

Sydney Edward Thomas, deceased, late of Hounslow, England, by Eva Emily Thomas, executrix, Hounslow, England, assignor to Quicktho (1928) Limited, Wandsworth, England, a company of Great Britain Application December 29, 1933, Serial No. 704,530
In Great Britain February 10, 1933

7 Claims. (Cl. 155—116)

This invention relates to seats and has more particular reference to vehicle seats, the object of the invention being to provide an improved construction and arrangement of seat which is so designed that its inclination can be adjusted at will to any degree within fixed limits.

According to the invention, an adjustable seat is provided with hand operated means for adjusting the position of the seat proper relatively to its support whilst simultaneously altering its degree of inclination.

The inventoin also consists in an adjustable seat wherein means are provided for sliding the seat proper forwardly or rearwardly whilst simultaneously altering its inclination and the angle between the back and the seat.

Reference will now be made to the accompanying drawings which illustrate by way of example a construction according to the invention and in which:—

Figure 1:
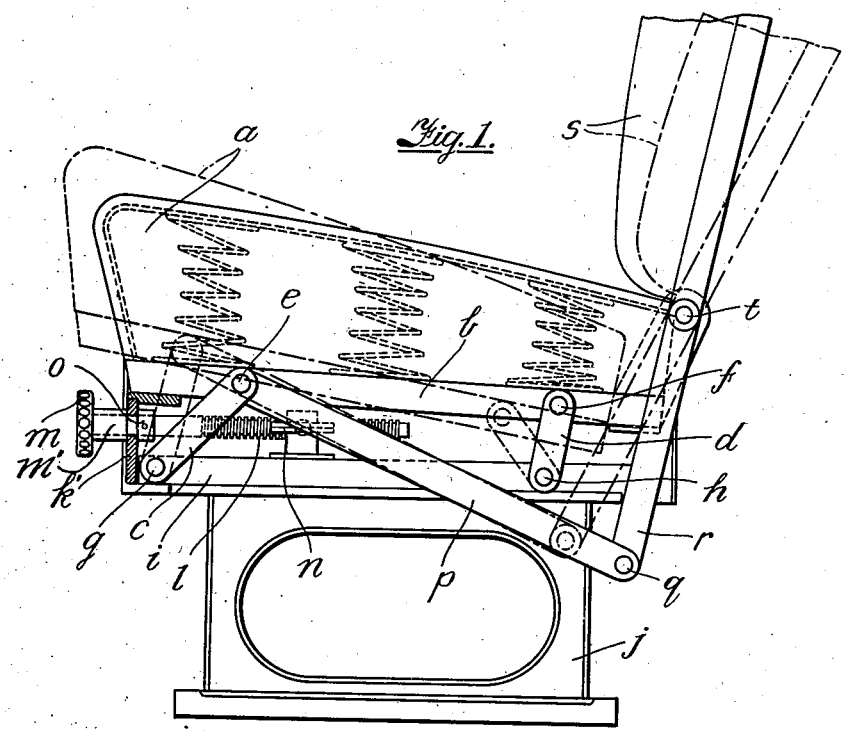
Figure 1 is an elevation of a seat partly in section.
Figure 2:
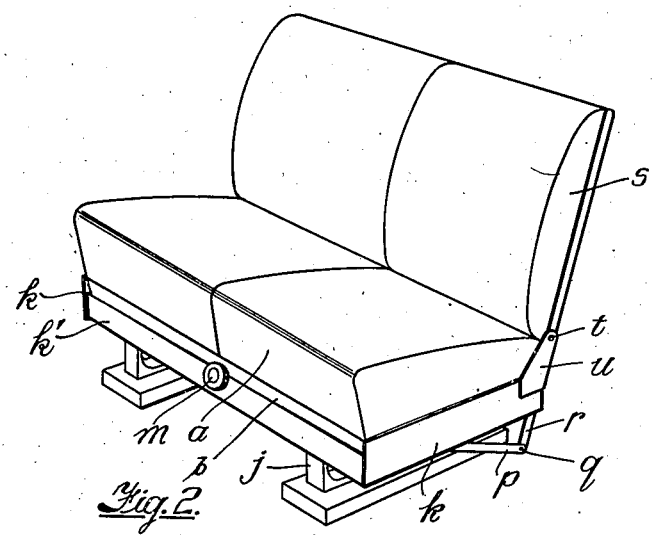
Figure 2 is a perspective view of the seat shown in Figure 1.
Figure 3:
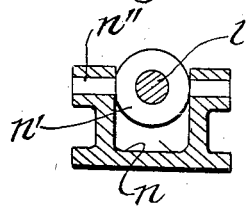
Figure 3 is a vertical section through the operating spindle, its nut and bearing.

In the construction illustrated which shows the invention applied to a seat suitable for an omnibus or coach, the seat proper $a$ is mounted on a movable baseplate or board $b$ carried at its sides by links $c$ and $d$, pivoted at $e$ and $f$, respectively, to the the sides of the movable base $b$, the said links extending upwardly from and being mounted on fixed pivots $g$ and $h$, respectively, disposed at the sides of a fixed base or base plate $i$ which is supported from the floor of the vehicle in any suitable manner such as by standards $j$.

The space between the movable and fixed base plates $b$ and $i$ is enclosed by suitable walls or frame pieces $k$ fixed to base plate $i$ and by a wall or frame piece $k'$ depending from base $b$ and extending across the front and ends of the seats. Said frame piece $k'$ is slidable forwardly and rearwardly with the seats $a$ and centrally of the frame, at the front, a screw threaded spindle $l$ is journalled, on whose outer end an operating knob or wheel $m$ and collar $m'$ are fixed, the spindle extending through the space between the two base plates and engaging near its inner end in a nut or screw threaded member $n'$ pivoted on a transverse axis by means of trunnions $n''$ in a bearing $n$ carried by the fixed base plate $i$. The spindle $l$ has a collar $o$ fixed thereon near its forward end engaging the front portion of the frame piece $k'$.

To the upper pivots $e$ of the forward links $c$ are connected the forward ends of levers $p$ whose rear ends are pivoted at $q$ to arms $r$ depending from a seat back $s$ pivoted at $t$ at a point adjacent the upper rear edge of the seat $a$, the pivot $t$ being carried by brackets $u$ extending upwardly and rearwardly from the fixed side frame elements $k$.

In the operation of the device above described rotation of the operating knob $m$ in one direction, since the collars $o$ and $m'$ prevent rectilinear movement of the spindle, causes the seat to move forwardly and lift or raise at its forward edge by reason of the fact that the links $c$ and $d$ move in an anti-clockwise direction round their pivots $g$ and $h$. This movement brings the links to the position shown in broken lines in Figure 1, the partial rotary movement having caused the links $c$ to lift the forward edge of the seat as it moves forwardly by the operation of the knob $m$ whilst the partial rotary movement of links $d$ which are set at a different angle from the links $c$, causes the rear portion of the seat to be depressed. Consequently as the position of the seat is adjusted its angle of inclination to the horizontal is varied.

This movement is also imparted to the links $p$ and $r$ to move the back $s$ of the seat rearwardly to correspond with the altered position of the seat.

If the rotation of the operating knob $m$ is effected in the opposite direction, the reverse of the operations above described will take place and the seat will be caused to assume a position in which its upper surface is more nearly horizontal, whilst the back $s$ of the seat will tend to approach a vertical position.

Figure 4:
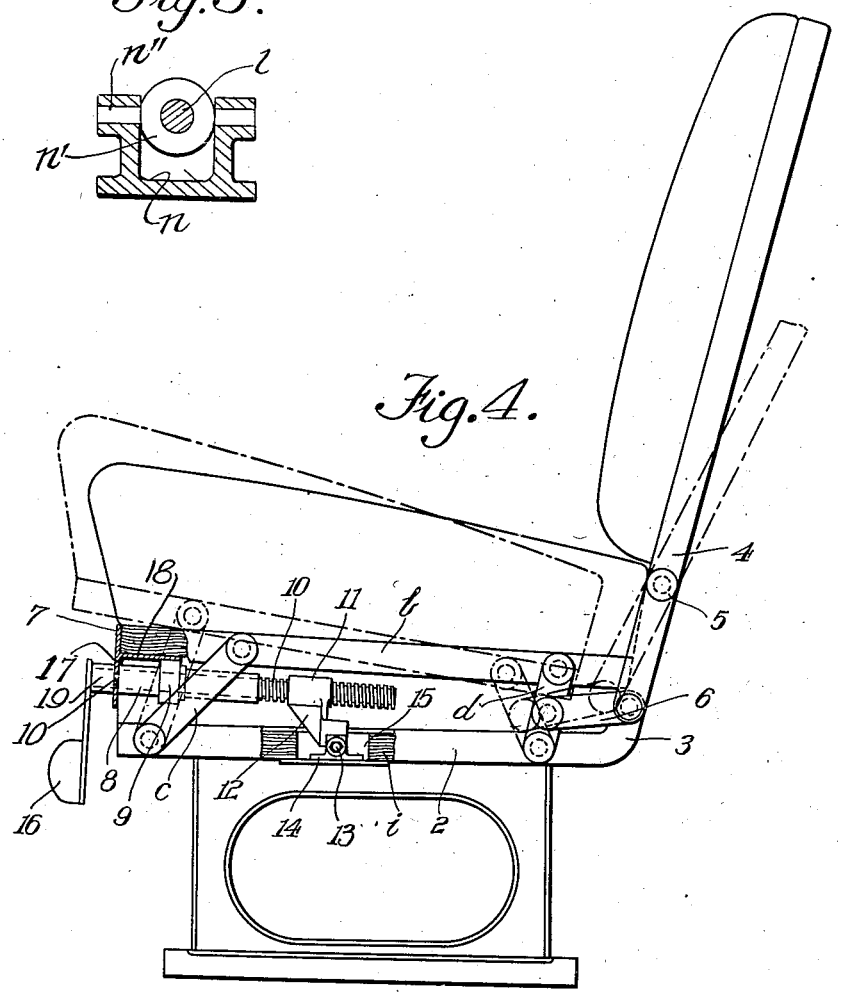
Figure 4 is a sectional elevation of a modified form of construction.

Referring now to the construction illustrated in Figure 4 the movable base $b$ is supported by links $c$ and $d$ arranged in the manner shown in Figure 1. The links $c$ and $d$ are pivoted at their lower ends to a metal framework member 2 whose rear end is bent upwardly to form a bracket 3 to which the frame elements 4 of the seat back are pivoted at 5, the lower end of the member 4 below the pivot 5 being pivotally connected to the mid-portion of the link $d$ by means of a link 6.

The forward end of the movable base $b$ carries a bracket 7 having downwardly and rearwardly extending portions 17 and 18, and a fixed guide 9 depending from the latter and having a sleeve 8 journalled therein. The sleeve 8 is fixed around the screw threaded spindle 10 which is journalled in portion 17 between said sleeve 8 and a sleeve or collar 19 fixed on the spindle. The threads of said spindle engage those of a nut 11 formed integral with a bracket 12, pivoted at 13, to a fixed plate 14 mounted within an aperture 15 formed in the fixed base plate i. The forward end of the sleeve 8 is provided with a handle 16 for manual operation.

The operation of this form of the invention is very similar to that described in connection with Figure 1 as the arrangement of the links c and d causes the seat to be tilted to the position shown in broken lines when it is moved forwardly, corresponding movement to tilt the seat back rearwardly taking place simultaneously.

The arrangement above described enables within the limits of movement allowed by the operating spindle a wide range of adjustment to be obtained in the setting of the seat and in the relative position of the seat back resulting in greater comfort and convenience to users of the vehicle thus equipped.

It is to be understood that various modifications may be made in the construction above described without departing from the invention. For example the links c and d which support the movable base plate b need not necessarily be of such length as to give the motion above described, but may be varied in their dimensions and setting to raise or lower the front or back portions of the seat as required to suit special conditions.

What is claimed is:

1. An adjustable seat structure comprising a base, angularly movable seat and back elements, means supporting the seat element on said base causing the seat element through forward movement to rise at its front edge and to lower at its rear edge, mechanism connected to the seat element and to said base element manually operative to slide the seat element forwardly and rearwardly, said back element including a rigid means pivoted adjacent the rear edge of the seat to the base, and linkage connected to said rigid means below its pivot and to the means supporting the seat element so as to tilt the back element rearwardly during forward movement of the seat element.

2. An adjustable seat structure comprising a base, angularly movable seat and back elements, means supporting the seat element on said base causing the seat element through forward movement to rise at its front edge and to lower at its rear edge and to move reversely through rearward movement, rotatable mechanism connected to the seat element and to said base element operative to move the seat element forwardly and rearwardly, said back element including a rigid means pivoted intermediate its ends to the base, and linkage connected to said rigid means below its pivot and to the means supporting the seat so as to tilt the back rearwardly during forward movement of the seat element.

3. An adjustable seat comprising a fixed base member, a movable base member carrying a seat, forward and rear links disposed at different angles pivoted to both base members supporting the movable base member above the fixed base member, the pivotal connections of the links to the movable base member being closer together than the pivotal connections of the links to the fixed base member to cause the front edge of the seat to rise and its rear edge to lower during forward movement of the seat, an operating spindle, means on the fixed base member to which said spindle is screw-threaded, means rotatably and non-slidably mounting said spindle on the movable base member, a back for said seat having a rigid depending arm pivoted to the fixed base member, and linkage connected to said arm below its pivot and to certain of said movable structure to tilt the back rearwardly during forward movement of the seat.

4. An adjustable seat according to claim 3 wherein said linkage includes a lever connecting the upper pivot of the forward link with the depending arm of the back.

5. An adjustable seat according to claim 3 including a nut pivotally mounted on the fixed base member and directly engaged by the screw threads of said spindle, and said linkage being pivoted to the rear link.

6. An adjustable seat comprising a fixed base plate, a movable base plate, a seat element on the latter base plate, links of different angularity pivoted to both base plates and supporting the movable base plate above the fixed base plate, the distance between the pivotal axes connecting the links to the movable base plate being shorter than that between the pivotal axes connecting the links to the fixed base plate to cause the forward edge of the seat element to rise with respect to the rear edge thereof when the seat element moves forwardly, a nut carried by the fixed base plate, a screw threaded operating spindle engaging said nut, a frame depending from said movable base plate, means rotatably and non-slidably mounting said spindle in said frame, a back having rigid means pivoted intermediate its ends to the fixed base plate adjacent the rear edge of the seat, and means connecting the lower end of said rigid means with certain of said links for causing the back to tilt rearwardly when the seat element moves forwardly.

7. An adjustable vehicle seat comprising a fixed base member, a movable base member having a seat thereon, links of different angularity supporting the movable base member on and above the fixed base member, the pivotal axes connecting the links to the movable base member being closer together than the pivotal axes connecting the links to the fixed base member to cause the forward edge of the seat to rise with respect to the rear edge thereof when the seat moves forwardly, a bearing pivoted to the stationary base member, a rotary spindle for hand adjustment of the seat mounted on the movable base member and screw threaded in said bearing, a back having rigid arm means pivoted intermediate its ends to the fixed base member, and link means connecting one of the first mentioned links with said arm means below the axis of the latter for causing the back to tilt rearwardly when the seat moves forwardly.

EVA EMILY THOMAS,
*Executrix of the Estate of Sydney Edward Thomas, Deceased.*